United States Patent [19]

Lappos

[11] Patent Number: 4,770,375

[45] Date of Patent: Sep. 13, 1988

[54] COLLECTIVE STICK FORCE-CHECK DEVICE

[75] Inventor: Nicholas D. Lappos, Orange, Conn.

[73] Assignee: United Technologies Corporation, Hartford, Conn.

[21] Appl. No.: 889,023

[22] Filed: Jul. 24, 1986

[51] Int. Cl.⁴ .............................................. B64C 13/04
[52] U.S. Cl. ..................................... 244/220; 73/1 B; 73/862.48; 244/224; 244/234
[58] Field of Search ............... 244/220, 223, 224, 234, 244/236; 340/665; 73/862.48, 862.53, 862.07, 1 B; 81/479, 477, 467

[56] References Cited

U.S. PATENT DOCUMENTS

| | | | |
|---|---|---|---|
| 2,289,238 | 7/1946 | Brunelle | 340/665 |
| 2,368,757 | 2/1945 | Graham | 73/862.53 |
| 2,759,357 | 8/1956 | Bos et al. | 73/862.53 |
| 2,889,729 | 6/1959 | Orner | 81/467 |
| 3,546,933 | 12/1970 | Grabovac | 73/862.53 |
| 4,586,387 | 5/1986 | Morgan et al. | 73/862.05 |

Primary Examiner—Galen Barefoot

[57] ABSTRACT

A device useful for verifying and setting the minimal resistive force setting of a collective stick in an aircraft using a collective stick is disclosed. The device is permanently attached to the collective stick and may be used by the pilot at any time. A method of setting the minimal resistive force setting on an aircraft using a collective stick is also disclosed.

5 Claims, 1 Drawing Sheet

U.S. Patent    Sep. 13, 1988    4,770,375
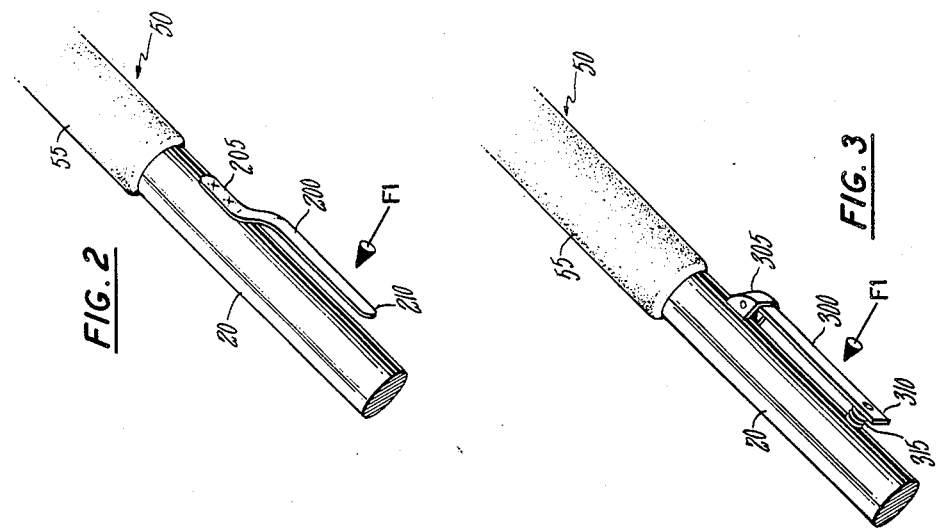
FIG. 2
FIG. 3
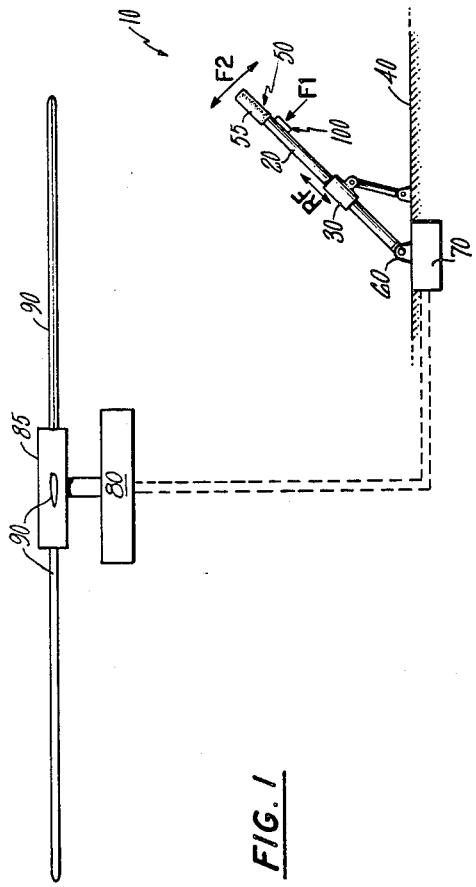
FIG. 1

COLLECTIVE STICK FORCE-CHECK DEVICE

TECHNICAL FIELD OF THE INVENTION

The invention relates to flight control systems more particularly to helicopter collective sticks.

BACKGROUND OF THE INVENTION

In helicopter flight control systems, a collective stick is utilized to govern the collective pitch of the main rotor blades. Typically, one end of the stick is pivotally attached to the airframe at a point to the pilot's left side, and the other end of the stick terminates in a handle within easy reach of the pilot's left hand. This allows for the pilot to grasp the handle and move the collective stick in an up or down direction which will cause the rotor blades to respond in a manner necessary to execute a flight maneuver.

A resistive force means, typically a collet assembly encircling a section of the shaft of the collective stick, is provided in order to impart a resistive force to the movement of the collective stick, and maintains the collective stick in the position last established by the pilot. Generally, this resistive force means is variable, allowing adjustment of the amount of resistive force imparted on the collective stick. In one embodiment, of the collet assembly, the variation is accomplished by means of a rotating collar which is grasped and rotated to establish a desired resistive force. The resistive force is often varied by the pilot to establish what the pilot feels is an acceptable resistance force opposing the force exerted by his hand on the collective stick.

The resistive force means satisfies two requirements. The first requirement is that the collective stick be maintained in the position last established by the pilot executing a flight maneuver. The second requirement is that there be a minimum resistance force to be overcome before the collective stick responds to any input from the pilot. This second requirement assures that pilot induced oscillations, or "PIO's", are not created by the pilot. PIO's are vertical oscillations of the aircraft resulting from flight instabilities that cause the pilot's body (notably his hand) to oscillate. When the pilot's hand is on the collective stick, the oscillations are transmitted to the control system where they are amplified in a vicious cycle.

A minimum resistive force for alleviating PIO's is determined by observing the flight characteristics of the aircraft and the characteristic response of the control system used and, once determined, is set on the resistive force means by the ground crew using an instrument. One such instrument, is a "stick force indicator", ("Stick-Force Indicator, Range 0–50 lbs" Brooklyn Tool & Machine Co. Inc., 380–384 Canal Street, New York, N.Y.) which is a springloaded force measuring device, suitable to be placed against the underside of the collective stick. A dial at one end of the stick force indicator indicates the force exerted on the collective stick via the stick force indicator, which aids the ground crew in setting the minimum resistance during normal maintenance procedures.

However, due to the ease with which the resistive force may be altered by the pilot, and an observed propensity among pilots to set the resistive force according to their own desire, it is readily appreciated that setting the resistive force means on the ground to a predetermined minimum resistance force so as to eliminate the possibility of PIO's is futile.

DISCLOSURE OF THE INVENTION

It is an object of the invention to provide a collective pitch apparatus which allows for the pilot, or other operator, to verify that the minimum resistance force has been properly set on the resistive force means at any time, without the requirement of any additional instruments.

Another object of the invention is to provide a means of setting a resistance force on a variable resistive force means which is at least as great as the minimum resistance force suitable for a particular aircraft, without the requirement of any additional instruments.

According to the invention, a force check means is permanently fixed to the collective stick for providing an indicator when a force exerted on the collective stick via the force check means equals the minimum resistance force found to be suitable for a particular aircraft.

Other objects, features, and advantages of the invention will become more apparent in light of the following description thereof.

BRIEF DESCRIPTION OF THE DRAWINGS

FIG. 1 is a diagrammatic view of the invention.

FIG. 2 is a view of an embodiment of the invention which utilizes a resilient lever as the force check means.

FIG. 3 is a view of an embodiment of the invention which utilizes a spring and lever assembly as the force check means.

BEST MODE FOR CARRYING OUT THE INVENTION

FIG. 1 shows a collective pitch apparatus 10 including collective stick 20, a control system input 70, a rotor servo 80, a rotor hub 85, and blades 90. One end 50 of the collective stick terminates in a handle 55 and other (lower) end 60 is pivotally mounted to the airframe 40 and is suitably attached to the control system input 70. The control system input 70 responds to motions of the collective stick 20, translating said motions into appropriate signals which are transmitted to the rotor control 80, which in turn, affects a desired response in the rotor hub 85, and the rotor blades 90. A resistive force means 30 is disposed about the collective stick between the handle end 50 and the lower end 60 of the collective stick 20, and is moveably attached to the airframe 40. The resistive force means 30 act upon the surface of the collective stick, which establishes a resistive force, labeled "RF", which must be overcome by a stick-moving force, "F2", is imparted by the pilot at the handle end 50 of the collective stick 20 before the collective stick moves and any response is elicited from the control system input 70. The resistive force means 30 may be adjusted to vary the resistive force, shown as "RF", imparted by the resistive force means 30.

A force check means 100 is located near the handle end 50 of the collective stick 20, and is fastened in a position on the underside so as not to interfere with the normal operations of the pilot, while providing for easy access by the pilot. The force check means 100 is calibrated to produce a response (which may be an audile signal, a tactile response, or the activation of a device such as a light or buzzer) at a preselected threshold force when a stick-moving force "F1", imparted to the force check means 100 overcomes the minimum resistance force recommended for the aircraft, which is exerted upon the collective stick 20 by the resistive force means 30. (The preselected threshold force is proportional to the minimum resistance force, as determined by the actual geometry of the arrangement.)

This allows the pilot to determine if the collective stick 20 will respond to a stick moving force which is less than the minimum resistive force. To do this, the pilot imparts a force on the force check means 100 and visually/tactilly observes the upward movement of the collective stick 20. If the collective stick 20 moves before the force check means 100 responds, (indicating that the preselected threshold force has been reached,) then the resistive force means 30 should be adjusted to increase the resistance force imparted on the collective stick 20. Alternatively, if the collective stick 20 moves approximately simultaneously, or after the force check means 100 responds, then the resistive force means 30 is set properly.

FIG. 2 is an embodiment of the invention which utilizes an elongated resilient lever 200 as the force check means 100. The lever 200 is made of a resilient strip of aluminum, or any other suitable resilient material. One end 205 of the lever 200 is fastened to the underside of the collective stick 20 at a point near the handle 50. The other end 210 of the lever 200 is spaced a suitable distance from the collective stick 20. The distance between the collective stick 20 and the spaced apart end 210 should be such that the lever 200 will resiliently bend, and contact the collective stick 20 when a stick-moving force, "F1", at least as great as the minimum resistance force, is applied by the pilot.

FIG. 3 is a view of an embodiment of the invention which uses a spring and lever assembly as the force check means 100. One end 305 of the lever 300, which is an elongated, nonresilient strip of aluminum or another suitable material, is pivotally mounted to the underside of the collective stick 20 at a point near the handle 50. The lever has a spaced apart end 310 which is a suitable distance from the collective stick 20 and a spring 315 interposed therebetween. The spring 315 should be selected so as to "bottom out" 20 when a force, "F1" at least as great as the minimum resistance force is applied against the force check means by the pilot.

In either the embodiment of FIG. 2 or FIG. 3, an indicator means may be disposed between the spaced-apart end 210,310 of the lever 200,300 so that when the lever contacts the collective stick via the indicator means, and indication thereof is provided to the pilot.

It should be understood that "indicator means" includes electrical contacts which close an electrical circuit to activate a device, or may be mechanical or audile indicator means, any of which may be incorporated into the design of the invention.

It should be obvious to one skilled in the art that the invention may be readily incorporated on other aircraft control sticks such as a cyclic stick.

I claim:

1. Collective pitch apparatus in an aircraft comprising;
   a collective stick movably attached at one end to an airframe and having a handle at the other end;
   resistive force means attached to the airframe for exerting a resistive force upon the collective stick in opposition to a stick-moving force applied to the collective stick;
   characterized by:
   force check means permanently fixed to the collective stick for providing a response to a preselected threshold force exerted on the collective stick via the force check means, the preselected threshold force being proportional to a preselected resistive force.

2. Collective pitch apparatus according to claim 1 characterized in that the force check means comprises:
   a lever disposed beneath the collective stick, one end of the lever affixed near the handle thereon, the other end of the lever being spaced apart from the collective stick so that when a stick-moving force at least as great as the threshold force is applied to the collective stick via the lever, the spaced apart end of the lever contacts the collective stick.

3. Collective pitch apparatus according to claim 2 characterized in that indicator means are disposed on the collective stick adjacent to the spaced apart end of the lever so that when the lever contacts the collective stick via the indicator means, an indication thereof is provided to the pilot.

4. Collective pitch apparatus according to claim 3 characterized in that the indicator means forms an electrical contact and the resilient lever forms another electrical contact, wherein the contacts complete an electrical circuit when the force check means responds to a preselected threshold force.

5. A method of setting the resistive force exerted on a collective stick by an adjustable resistive force means, comprises:
   providing a force check means permanently fixed to the collective stick in an aircraft responsive to a preselected threshold force exerted on the collective stick via the force check means;
   exerting a stick-moving force to the collective stick via the force check means;
   adjustably varying the resistive force means until the force check means responds approximately simultaneously with the movement of the collective stick.

* * * * *